United States Patent
Knudsen et al.

(10) Patent No.: US 11,888,358 B2
(45) Date of Patent: Jan. 30, 2024

(54) EMERGENCY STOP ACTIVATING A CIRCUIT BREAKER

(71) Applicant: LINAK A/S, Nordborg (DK)

(72) Inventors: Martin Kahr Knudsen, Sydals (DK); Jan Frølich, Sønderborg (DK)

(73) Assignee: Linak A/S, Nordborg (DK)

( * ) Notice: Subject to any disclaimer, the term of this patent is extended or adjusted under 35 U.S.C. 154(b) by 425 days.

(21) Appl. No.: 17/292,047

(22) PCT Filed: Nov. 8, 2019

(86) PCT No.: PCT/DK2019/000366
§ 371 (c)(1),
(2) Date: May 7, 2021

(87) PCT Pub. No.: WO2020/094194
PCT Pub. Date: May 14, 2020

(65) Prior Publication Data
US 2021/0399614 A1    Dec. 23, 2021

(30) Foreign Application Priority Data
Nov. 9, 2018 (DK) .......................... PA 2018 00847

(51) Int. Cl.
*H01H 3/02* (2006.01)
*H02K 11/30* (2016.01)
(Continued)

(52) U.S. Cl.
CPC ........... *H02K 11/30* (2016.01); *A61G 7/1017* (2013.01); *A61G 7/1063* (2013.01); *H01H 3/022* (2013.01); *H02K 5/04* (2013.01); *H02K 7/14* (2013.01)

(58) Field of Classification Search
CPC ......... H01H 3/022; A61G 7/1063; H02K 5/04
See application file for complete search history.

(56) References Cited

U.S. PATENT DOCUMENTS

| 1,706,518 A | 3/1929 | Blough |
| 5,444,203 A * | 8/1995 | Gunnarsson ............. F16P 3/00 200/510 |

(Continued)

*Primary Examiner* — Vanessa Girardi
(74) *Attorney, Agent, or Firm* — Dykema Gossett PLLC (57) ABSTRACT

Emergency stop for a linear actuator system, which comprises a housing (13) and an activation button (12) adapted for activating a circuit breaker and where the activation button (12) has a neutral position and an emergency position. The emergency stop further comprises a spring (19) for spring-loading the activation button (12) for retaining the activation button (12) in the neutral position, a latching mechanism adapted for retaining the activation button (12) in the emergency position once it has entered this position, and a release mechanism adapted to unlatch the latching mechanism. The spring-loaded activation button (12) is pivotally connected to the housing (13) and arranged to pivot between the neutral position and the emergency position. The spring-loaded activation button (12) comprises an arm (26,27) having one end attached to the underside (24) of the spring-loaded activation button (12). The housing 13 comprises a wall piece (35,36) adapted for engaging a free end of the arm (26,27). The latching mechanism comprises a protruding part (61,62) on the arm (26,27) and a receiving part (39,40) on the wall piece (35,36), said protruding part (61,62) and said receiving part (39,40) being unlatched when the activation button (12) is in the neutral position and latched when the activation button (12) is in the emergency position. The release mechanism comprises a reactivation button (14,15) movable between a first and second position, said reactivation button (14,15) unlatches the latching mechanism by disengaging the protruding part (61,62) from the receiving part (39,40) when the reactivation button (14,15) is moved from the first position to the second position.

10 Claims, 11 Drawing Sheets

(51) Int. Cl.
*A61G 7/10* (2006.01)
*H02K 5/04* (2006.01)
*H02K 7/14* (2006.01)

(56) References Cited

U.S. PATENT DOCUMENTS

| | | |
|---|---|---|
| 2005/0139459 A1 | 6/2005 | Gass et al. |
| 2007/0222234 A1* | 9/2007 | Liang ................ E05C 17/50 |
| | | 292/338 |
| 2018/0323018 A1 | 11/2018 | Taborsky |

* cited by examiner

EMERGENCY STOP ACTIVATING A CIRCUIT BREAKER

CROSS-REFERENCE TO RELATED APPLICATIONS

This application is a national stage filing based upon international application no. PCT/DK2019/000366, filed 8 Nov. 2019 (the '366 application), and published in English on 14 May 2020 under international publication no. WO 2020/094194 A1, which claims priority to Denmark (DK) patent application no. PA 2018 00847, filed 9 Nov. 2018 (the '847 application). The '366 application and the '847 application are both hereby incorporated by reference as though fully set forth herein.

The present invention relates to an emergency stop especially for an electrically driven linear actuator system comprising one or more electrically driven linear actuators. Such electrically driven linear actuators are used in many different applications for adjusting the position of patient lifts and adjustable articles of furniture, including hospital beds, patient supports or the like.

A common challenge with emergency stops in such environments is on the one hand to provide accessibility and on the other hand avoid unintended activation. Further, reactivation of the emergency stop is also very important and can be subject to the exact same challenges.

Providing washable emergency stops which can also withstand cleaning agents is another challenge that must be met.

The object of the present invention is to provide an alternative emergency stop.

The object is achieved by an emergency stop for a linear actuator system comprising a housing, an activation button adapted for activating a circuit breaker, where the activation button has a neutral position and an emergency position. The emergency stop further comprises a spring for spring-loading the activation button for retaining it in the neutral position and a latching mechanism adapted for retaining the activation button in the emergency position once it has entered this position, and a release mechanism adapted to unlatch the latching mechanism. The spring-loaded activation button is pivotally connected to the housing and arranged to pivot between the neutral position and the emergency position. The spring-loaded activation button further comprises an arm having one end attached to the underside of the spring-loaded activation button. The housing comprises a wall piece adapted for engaging a free end of the arm. The latching mechanism comprises a protruding part on the arm and a receiving part on the wall piece. The protruding part and the receiving part are unlatched when the activation button is in the neutral position and latched when the activation button is in the emergency position. The release mechanism comprises a reactivation button movable between a first and a second position. The reactivation button unlatches the latching mechanism by disengaging the protruding part from the receiving part when the reactivation button is moved from the first position to the second position.

Hereby, an emergency stop is provided where the mechanical part can be separated from a circuit breaker, and further providing an emergency stop which is washable and which can withstand cleaning agents. The emergency stop comprises only a few parts, which are simple to manufacture and assemble, thus keeping costs at a minimum. By having the emergency stop at an upper end of the housing, unintended activation of the activation button can be mitigated. Reactivation of the emergency stop requires a different kind of manual operation than activation of the activation button, which mitigates unintended reactivation.

In an embodiment, the wall piece of the emergency stop constitutes a part of a groove, where the wall piece is an outer wall of the groove, and where the groove is further defined by an inner side wall, an end wall, and a bottom.

In an embodiment, the reactivation button of the emergency stop comprises a pin adapted for engaging the arm. Hereby, the migration of the reactivation button is minimized and a correct engagement between the pin and arm is ensured.

In an embodiment, the release mechanism comprises a spring for spring-loading the reactivation button for retaining it in the first position. Hereby, it is ensured that the reactivation button is kept in the first position unless operated to the second position.

The present invention further relates to a control box for a linear actuator system comprising a detachable power supply, where the power supply comprises the emergency stop. In an embodiment, the control box comprises a base adapted for receiving the detachable power supply.

In an embodiment, the reactivation button of the detachable power supply comprises a hook. The base comprises an indentation for latching engagement with the hook of the reactivation button. By this engagement, the detachable power supply can easily be connected to the control box.

The invention further relates to a linear actuator system comprising an electric linear actuator and an operating unit, and the control box.

The invention further relates to a patient lift comprising the linear actuator system.

The emergency stop according to the invention will be described more fully below with reference to the accompanying drawing, in which.

Figure 1:
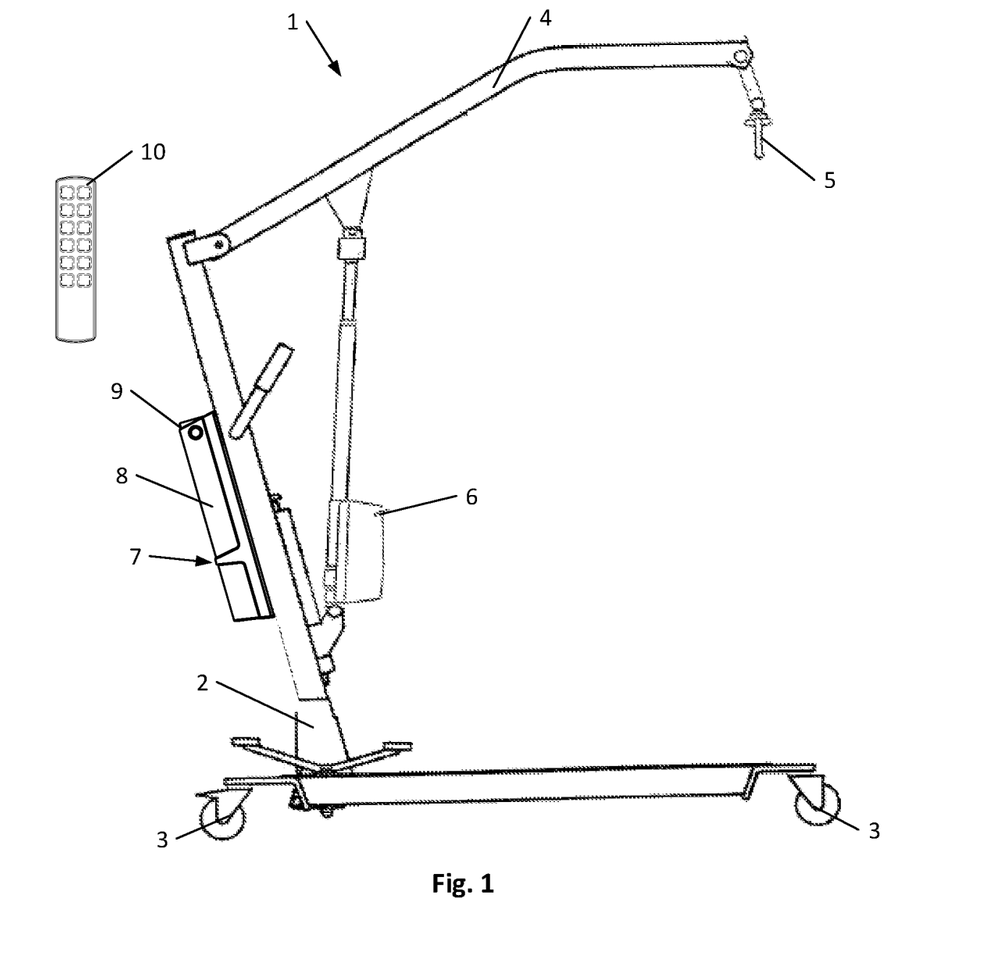
FIG. 1 shows a patient lift comprising a linear actuator system with an emergency stop.

FIG. 1 shows a patient lift 1 comprising a frame 2 equipped with drive wheels 3. A cantilever 4 pivotable around a horizontal axis is with one end secured to the frame 2. To the other end of the cantilever 4, a lifting hook 5 for lifting a patient is secured. The patient lift 1 comprises an electric linear actuator system having an electric linear actuator 6, a control box 7 with a controller, a power supply 8, an emergency stop 9 and an operating unit 10. The cantilever 4 may be raised and lowered by means of a linear actuator 6, which with one end is secured to the frame 2 and with the other end is secured to the cantilever 4. In the illustrated embodiment of the electric linear actuator system, the control box 7 also houses the emergency stop 9 and the power supply 8, e.g. rechargeable batteries. By activating the emergency stop 9, operation of the electric linear actuator 6 is prevented. Hence, when the emergency stop 9 is activated, a raising or lowering operation of the cantilever 4 will be stopped, or operation of the electric linear actuator 6 cannot be initiated.

Figure 2A:
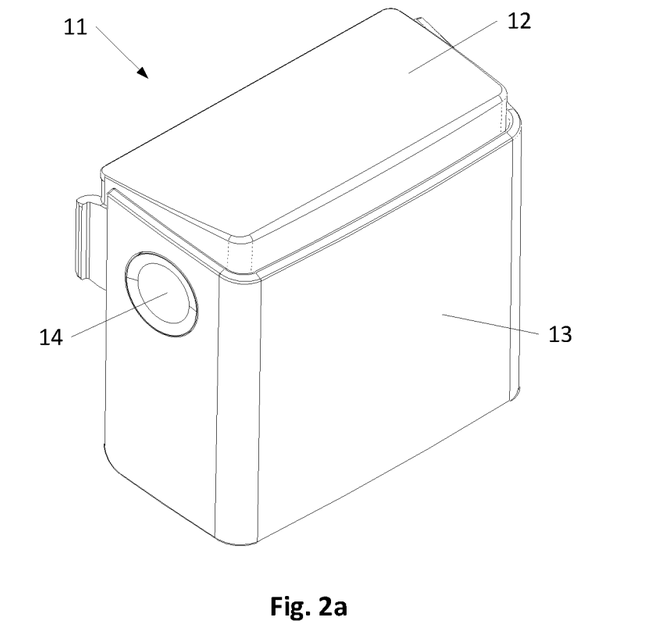
FIG. 2*a* shows a perspective view of an emergency stop.
Figure 2B:
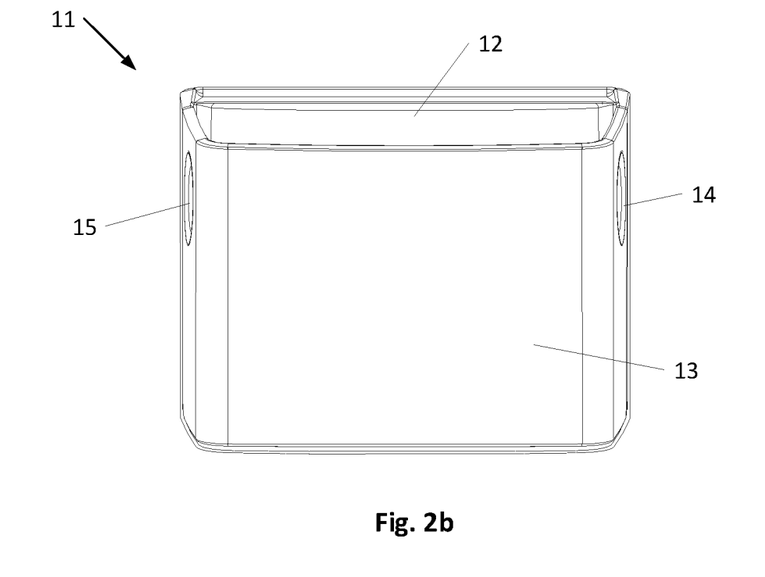
FIG. 2*b* shows a front view of the emergency stop of FIG. 2*a*.

FIG. 2 shows an emergency stop 11 comprising a spring-loaded activation button 12, a housing 13, and a reactivation button 14, 15. The activation button 12 is adapted for directly or indirectly activating a circuit breaker, where the activation button 12 has a neutral position and an emergency position. In the neutral position, the activation button 12 is configured to control the circuit breaker to be in a condition where the switch is bridged and can transfer an electric current. In the emergency position, the activation button 12 is configured to control the circuit breaker to be in a condition where the switch is open and cannot transfer an electric current.

In the present embodiment, a part of the activation button 12 extends out of an upper end 16 of the housing 13 when the emergency stop 11 is in a neutral position. The activation button 12 is pivotable about the axis 17. The emergency stop 11 is activated by pressing the activation button 12. This causes the activation button 12 to rotate it into an emergency position. In this position, the top surface 18 of the activation button 12 will be flush with the upper end 16 of the housing 13. Once the activation button 12 is in the emergency position, it cannot be operated to bring it back to the neutral position. This can only be done by operating the reactivation buttons 14, 15 located on either side of the outer wall of the housing 13. Pressing these will bring the activation button 12 from the emergency position to the neutral position. How this mode of operation is brought about will be described in more detail in FIGS. 3-14.

Figure 3:
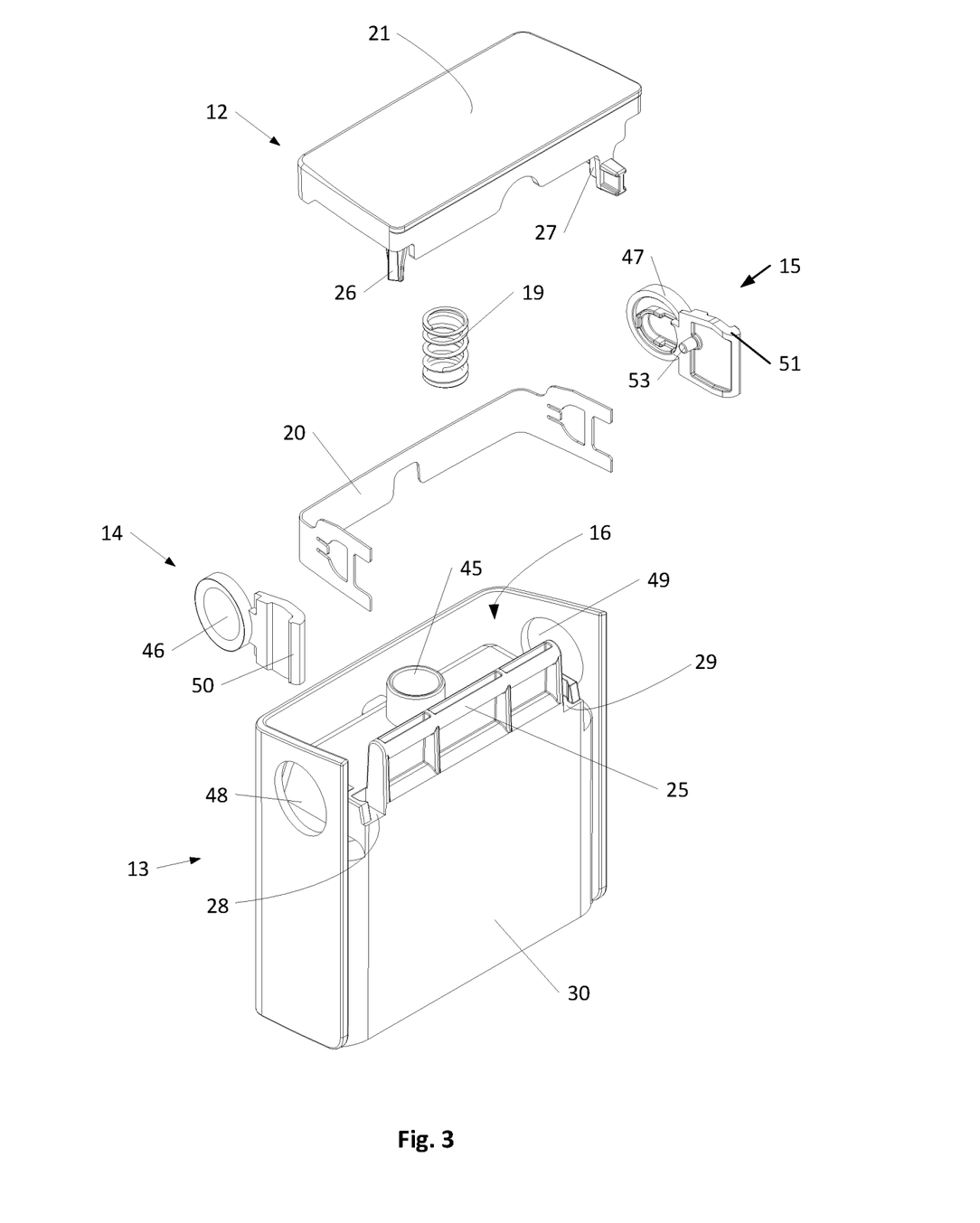
FIG. 3 shows an exploded view of the emergency stop of FIG. 2.
Figure 4:
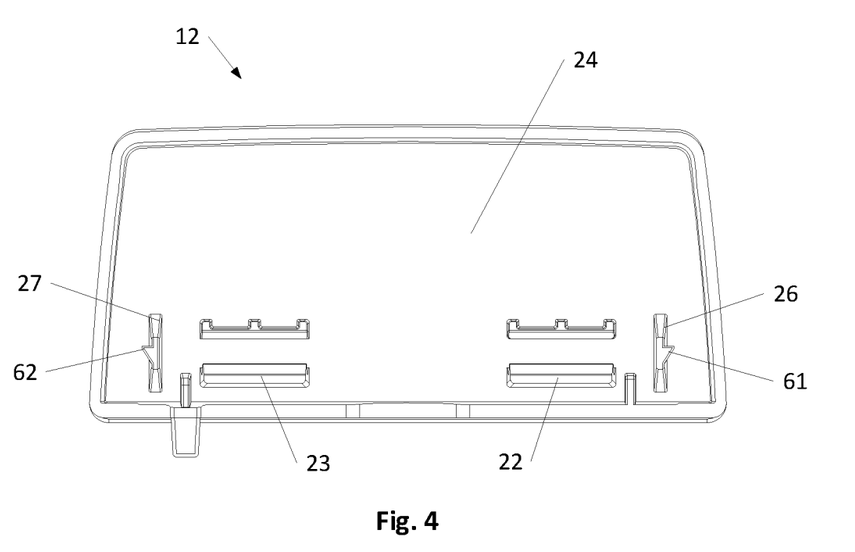
FIG. 4 shows a bottom view of the activation button.
Figure 5:
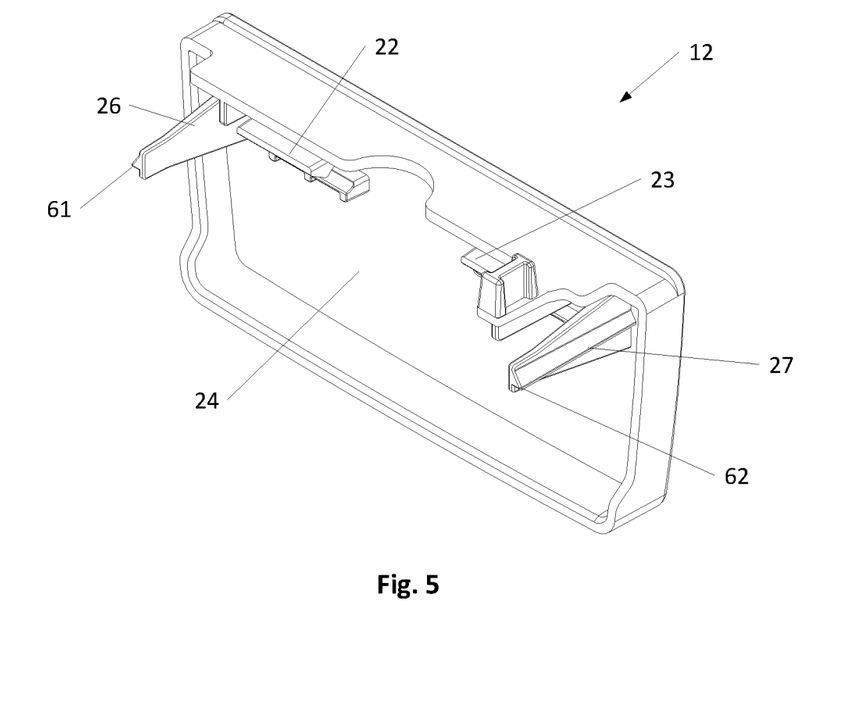
FIG. 5 shows a perspective view of the activation button.
Figure 6:
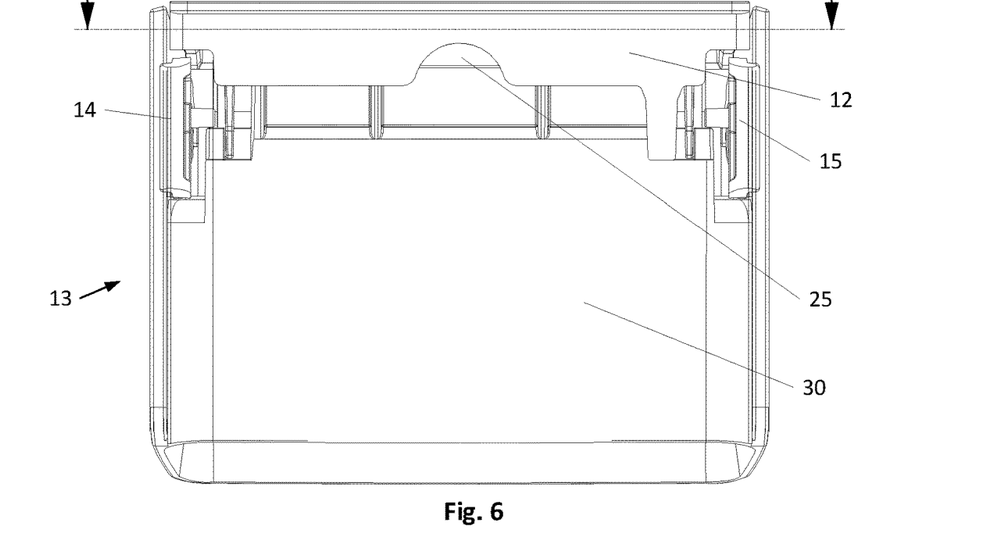
FIG. 6 shows a rear view of the emergency stop with a section line at the top.
Figure 7:
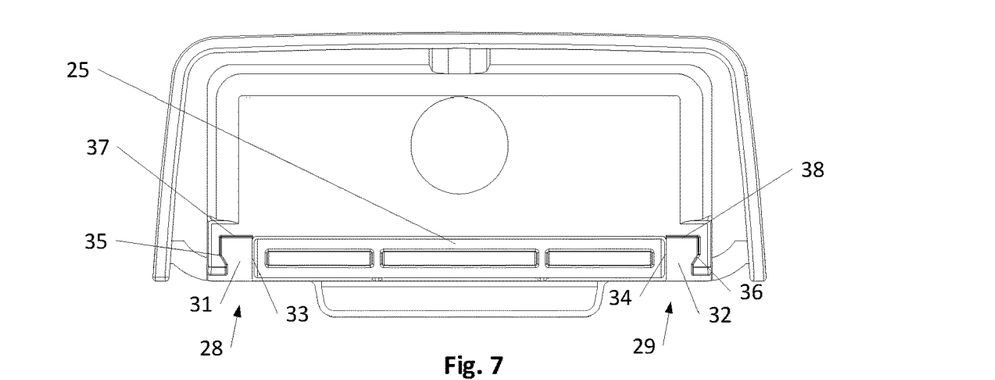
FIG. 7 shows a top view of the housing.
Figure 8:
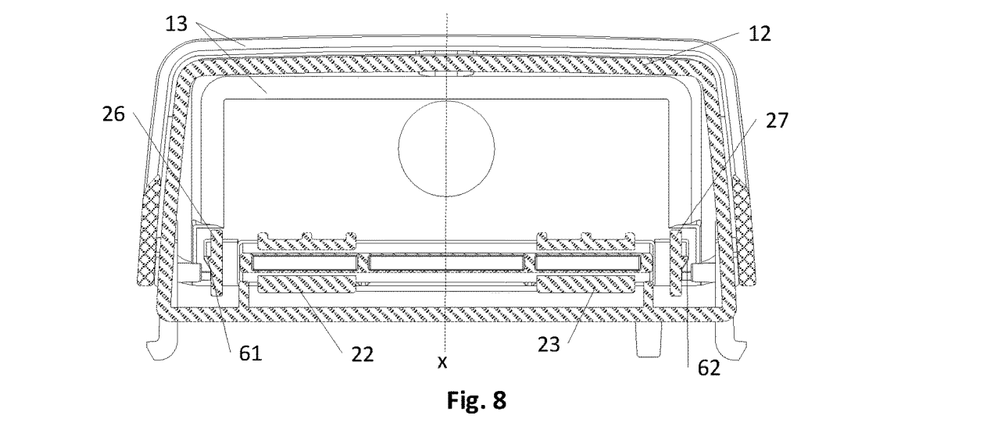
FIG. 8 shows a cross-section of the section line in FIG. 6.
Figure 9:
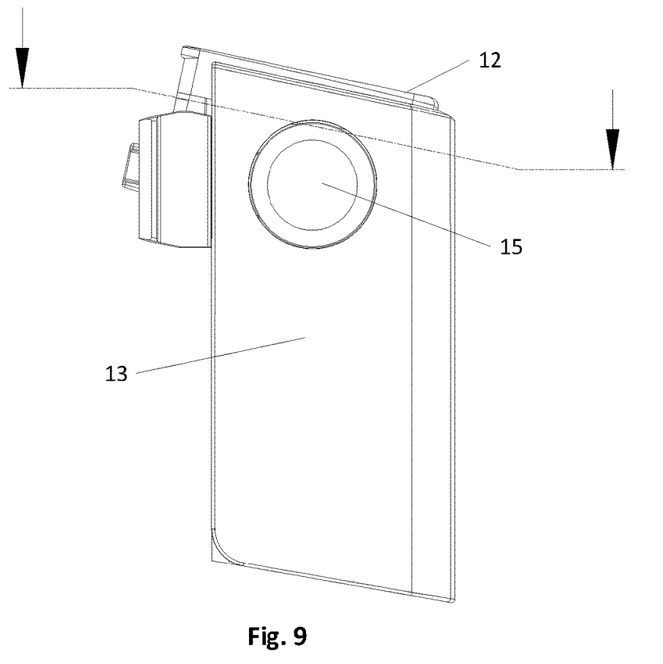
FIG. 9 shows a side view of the emergency stop with a section line at the top.
Figure 10:
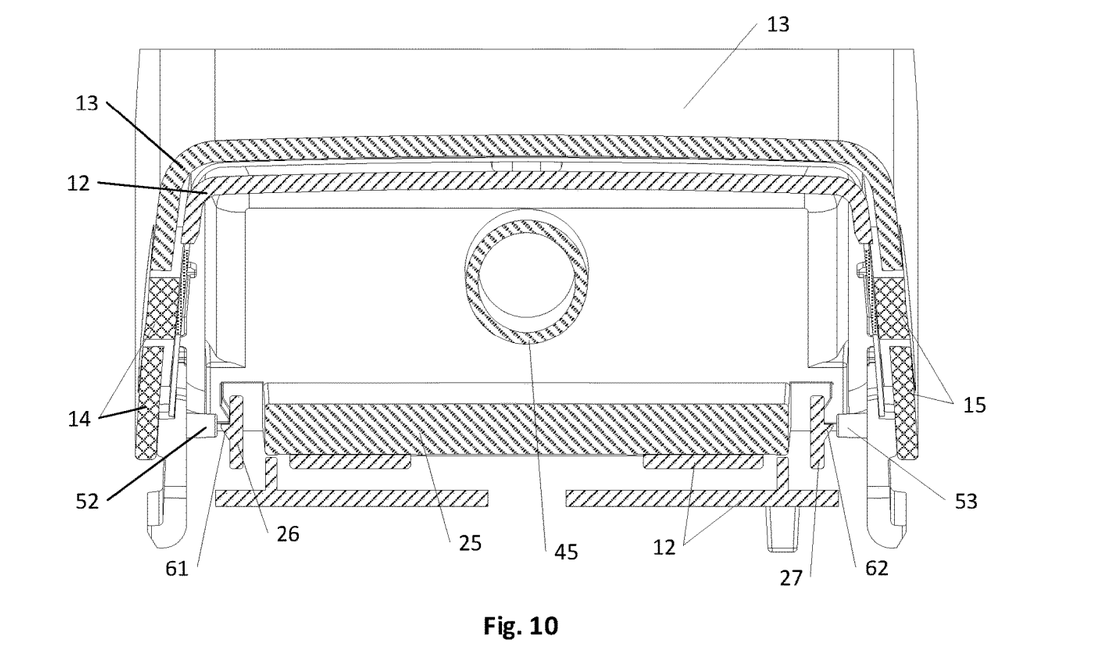
FIG. 10 shows a cross-section of the section line in FIG. 9.

FIG. 3 shows an exploded view of the emergency stop of FIG. 2 further showing a coil spring 19 and a U-shaped spring steel 20. The activation button 12 comprises a top surface 21 and two hinge knuckles 22,23 (see FIGS. 4 and 5) extending from the underside 24 opposite the top surface 21. The two hinge knuckles 22,23 are adapted to receive the hinge pin 25 on the upper end 16 of the of the housing 13, so that the activation button 12 is pivotably connected to the housing 13. Thus, the activation button 12 can pivot about the axis 17 (see FIG. 6).

On the activation button 12 two arms 26,27 are extending from the underside 24 approximately perpendicular thereto. Each of the arms 26,27 engage a groove 28,29 at the upper end 16 of the housing 13. The groove 28,29 is open towards the top of the housing 13 and towards the rear side 30 of the housing 13. When the activation button 12 is connected to the housing 13, the arms 26,27 are received in the grooves 28,29 through the opening towards the top of the housing 13.

Each of the grooves 28,29 consist of a bottom 31,32, a first side wall 33,34, a second side wall 35,36 and an end wall 37,38. The bottom 31,32 is facing towards the top of the housing 13, and the end wall 37,38 is facing towards the rear side 30 of the housing. The grooves 28,29 are symmetric in a mirrored manner along a line perpendicular to the axis x (see FIG. 8). This means that the first side walls 33,34 of the grooves 28,29 are closer to each other compared to the second side wall 35,36, which are further away from each other.

Figure 11:
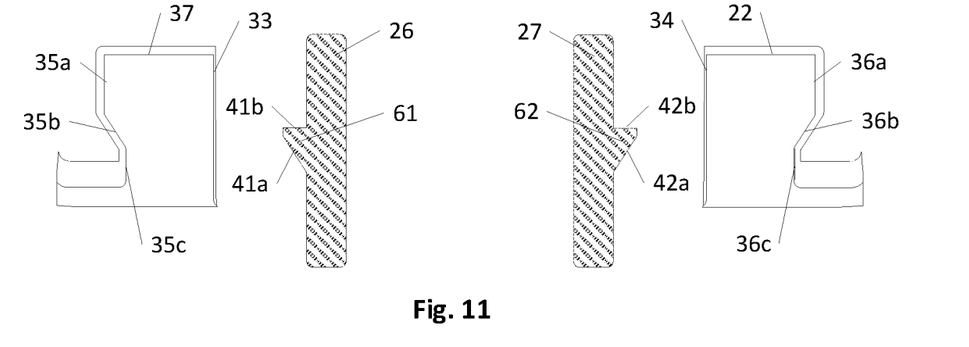
FIG. 11 shows a sketch of the grooves of the housing and a cross-section of the arms of the activation button.

Referring to FIG. 11 and starting from the end wall 37,38, the second side wall 35,36 has a first straight section 35a,36a, then a sloping section 35b,36b followed by a second straight section 35c,36c. The straight sections 35a, 36a,35c,36c and the first side wall 33,34 extends perpendicular to the end wall 37,38. The distance between the first straight section 35a,36a and the first side wall 33,34 is greater than the distance between the second straight section 35c,36c and the first side wall 33,34, creating a narrow entrance to the grooves 28,29 from the rear side 30 of the housing. At this entrance to the grooves 28,29, the second straight section 35c,36c terminates in a receiving part 39,40 extending perpendicular to the second straight section 35c, 36c and parallel to the end wall 37,38.

The arms 26,27 have an oblong rectangular cross-section, where a first side 41,42 is facing the first side walls 33,34 of the grooves 28,29, and a second side 43,44 is facing the second side wall 35,36 of the grooves 28,29. The second side 43,44 of the arms 26,27 is, apart from a protrusion 61,62, parallel to the straight sections 35a,36a,35c,36c of the grooves 28,29. The protrusion 61,62 has a sloping section 41a,42a approximately parallel to the sloping section 35b, 36b of the second side wall 35,36 of the grooves 28,29. Further, the protrusion 61,62 has a projecting edge 41b,42b parallel to the receiving part 39,40 and the end wall 37,38.

Figure 12:
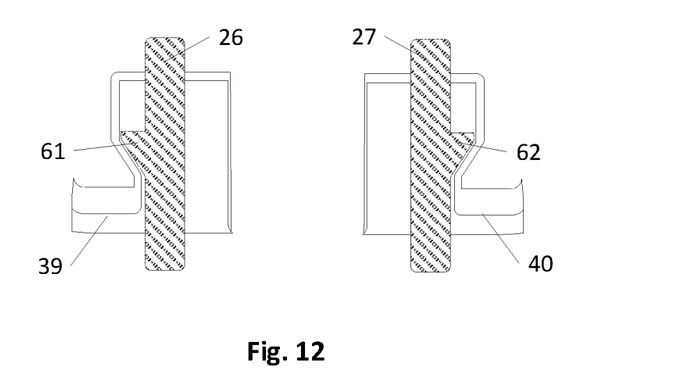
FIG. 12 shows a sketch of the grooves and arms of FIG. 11 when the activation button is in the neutral position.
Figure 13:
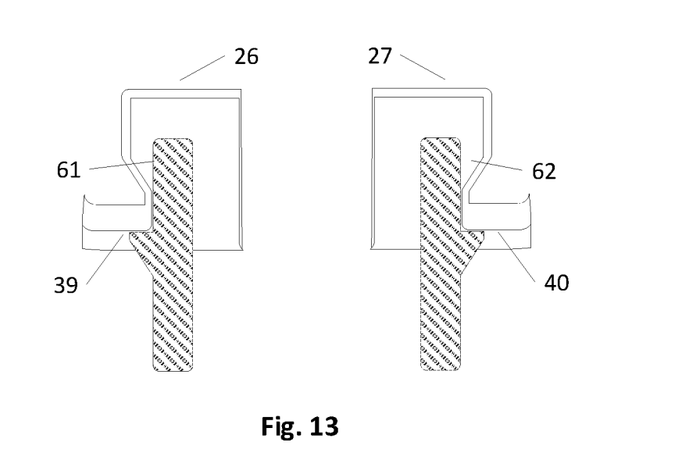
FIG. 13 shows a sketch of the grooves and arms of FIG. 11 when the activation button is in the emergency position.

In the neutral position of the activation button 12, the sloping section 41a,42a of the arm 26,27 engages the sloping section 35b,36b of the second side wall 35,36 of the grooves 28,29 (see FIG. 12). In order to keep the activation button 12 in the neutral position, the coil spring 19 is arranged in a well 45 at the upper end 16 of the housing 13 so that it engages the underside 24 of the activation button 12. In the neutral position, the activation button 12 merely rests on the coil spring 19, which positions the arms 26,27 in the grooves 28,29.

Upon activation of the emergency stop, the activation button 12 is pressed, which causes it to pivot and be pushed into the upper end 16 of the housing 13. Since the arms 26,27 extend from the underside 24 of the activation button 12, they are pushed out of the grooves 28,29 (see FIG. 13). More precisely, the sloping section 41a,42a of the arm 26,27 passes the sloping section 35b,36b of the second side wall 35,36 of the grooves 28,29. Once the arms 26,27 have exited the grooves 28,29, the projecting edge 41b,42b of the arm 26,27 will engage or latch with the receiving part 39,40 at the entrance to the grooves 28,29. This latch is quite firm due to the potential energy of the coil spring 19, which was accumulated when the activation button 12 was pressed resulting in a compression of the coil spring 19. However, the potential energy cannot be released due to the firm engagement between the projecting edges 41b,42b and receiving parts 39,40, which thus prevents the arms 26,27 from re-entering the grooves 28,29. Further, since the arms 26,27 are inaccessibly arranged inside the upper end 16 of the housing 13, the activation button 12 or the arms 26,27 are prevented from being operated or manipulated into re-entering the grooves 28,29.

The housing 13 does not necessarily have to comprise grooves 28,29 in order to achieve the latching of the activation button 12 in the emergency position. A simple latching mechanism could also be embodied by having a wall piece with a receiving part in the housing 13, adapted for engagement with a protrusion on the arms 26,27. Hence, when the activation button 12 is pressed, the free end of the arm 26,27 is deflected relative to the wall piece, such that the protruding part of the arm 26,27 catches the receiving part and thereby bringing the latching mechanism into a latched state retaining the activation button 12 in the emergency position. This wall piece could for example be embodied as the second side wall 35,36.

Figure 14A:
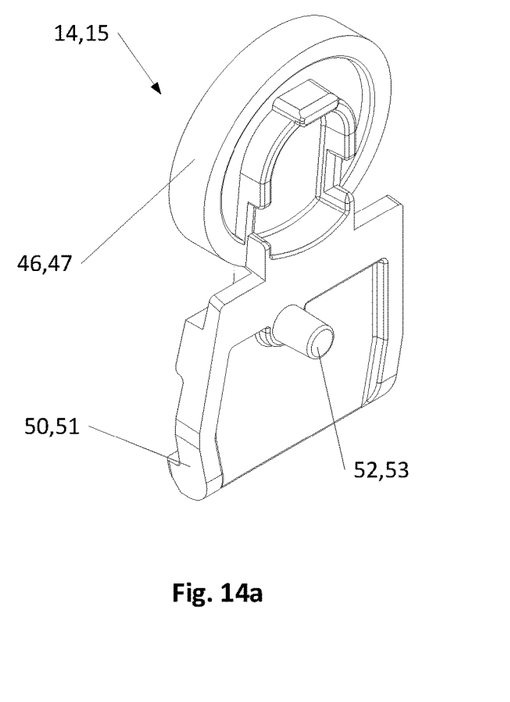
FIG. 14*a-c* shows different views of a reactivation button.
Figure 14B:
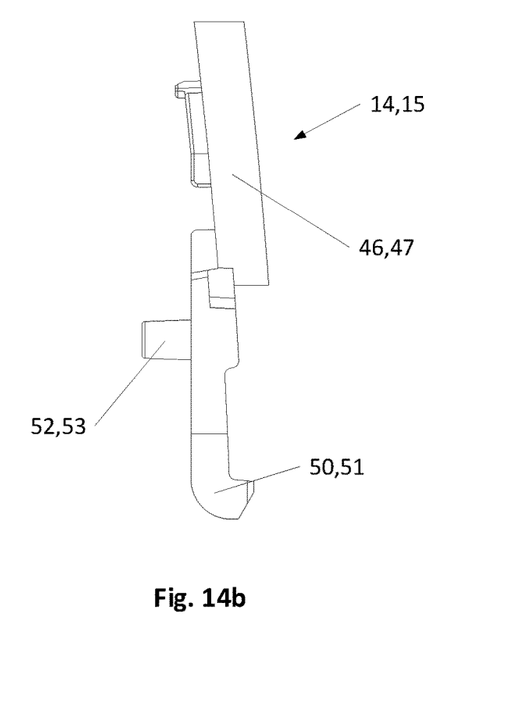
Figure 14C:
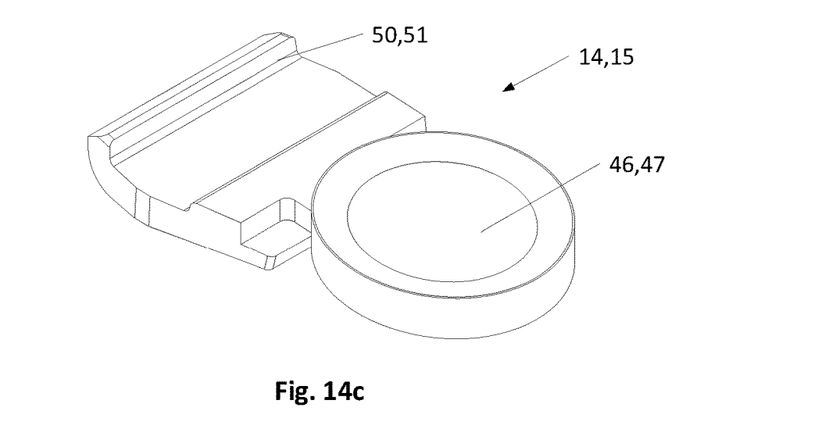

The reactivation buttons 14,15 comprise an operating part 46,47 arranged in an opening 48,49 in either side of the housing 13. Further, the reactivation buttons 14,15 comprise a hook 50,51 and a pin 52,53. The U-shaped spring steel 20 is arranged in the upper end 16 of the housing and is at each free end connected to the reactivation buttons 14,15. The U-shaped spring steel 20 is prestressed such that it keeps the reactivation buttons 14,15 in place, including the operating parts 46,47 in the openings 48,49.

When the activation button 12 is in the emergency position, the protrusions 61,62 of the arms 26,27 are positioned opposite the free end of the pins 52,53. By pressing the operating part 46,47 of the reactivation buttons 14,15 into the opening 48,49, the pins 52,53 engage the protrusions 61,62 of the arms 26,27 and deflect the free end thereof towards the entrance of the grooves 28,29. When the arms are positioned at the entrance to the grooves 28,29, the potential energy of the coil spring 19 will move the free end of the arms 26,27 into the grooves 28,29 and thus pivot the activation button 12 back to the neutral position. The reactivation buttons 14,15 must be pressed approximately simultaneously for the activation button 12 to reach the neutral position. As the reactivation buttons 14,15 are released, they will, due to the U-shaped spring steel 20, move into their original position.

Figures 15, 16:
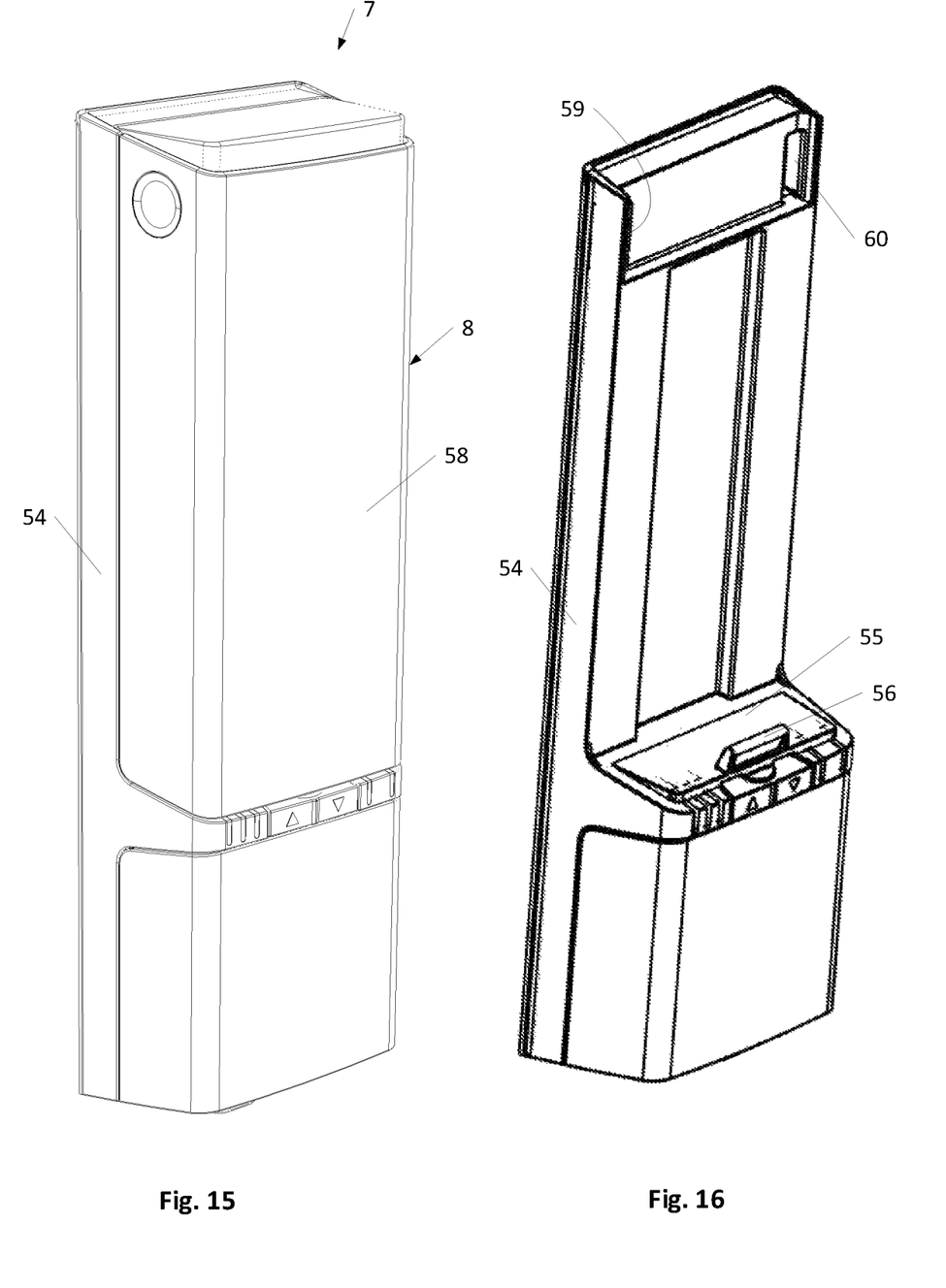
FIG. 15 shows a perspective view of a control box comprising a detachable power supply.
FIG. 16 shows a perspective view of the control box of FIG. 15 without the detachable power supply.
Figure 17:
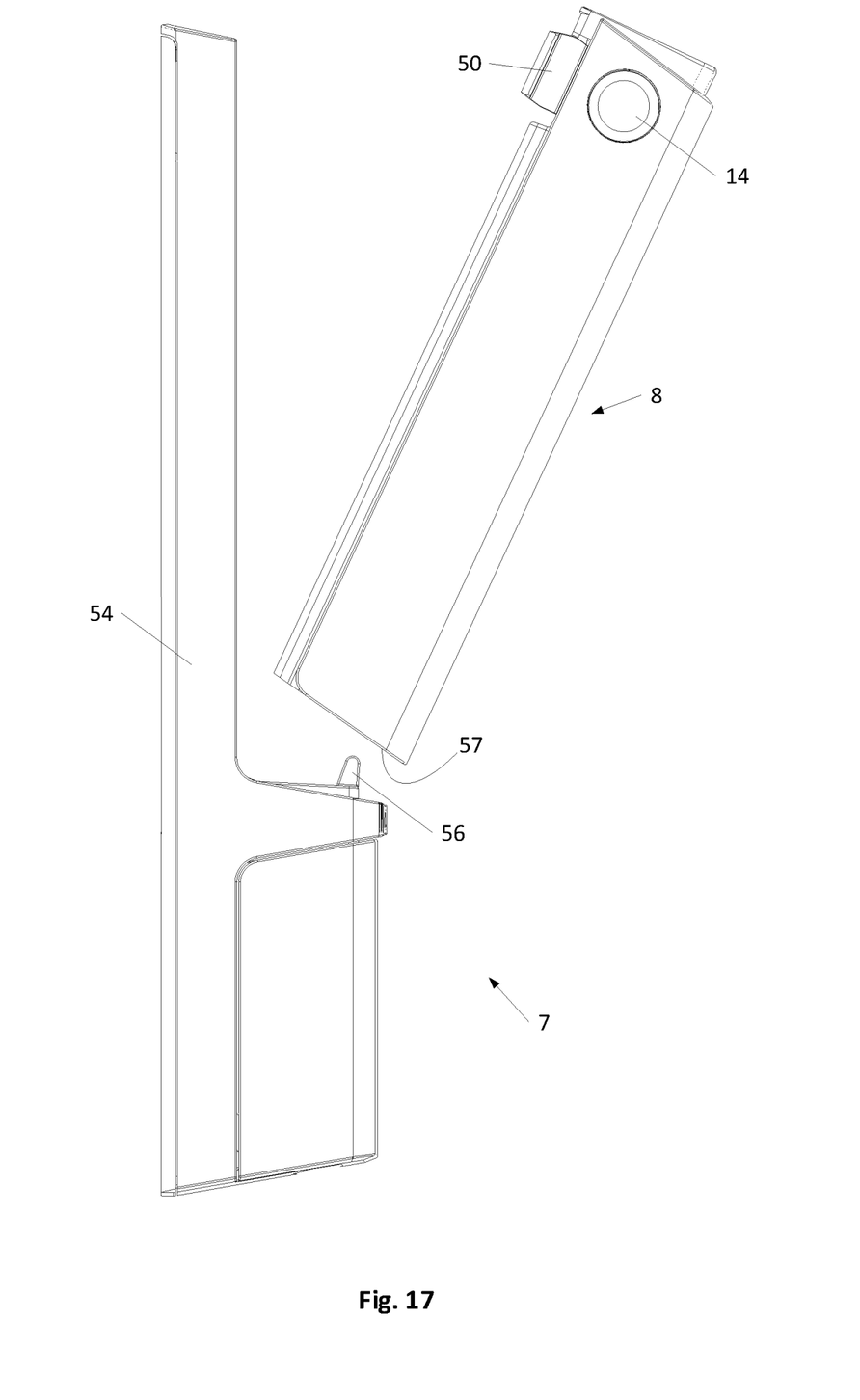
FIG. 17 shows a side view of the control box of FIG. 15 where the detachable power supply is about to be attached to or detached from the base of the control box.
Figure 18:
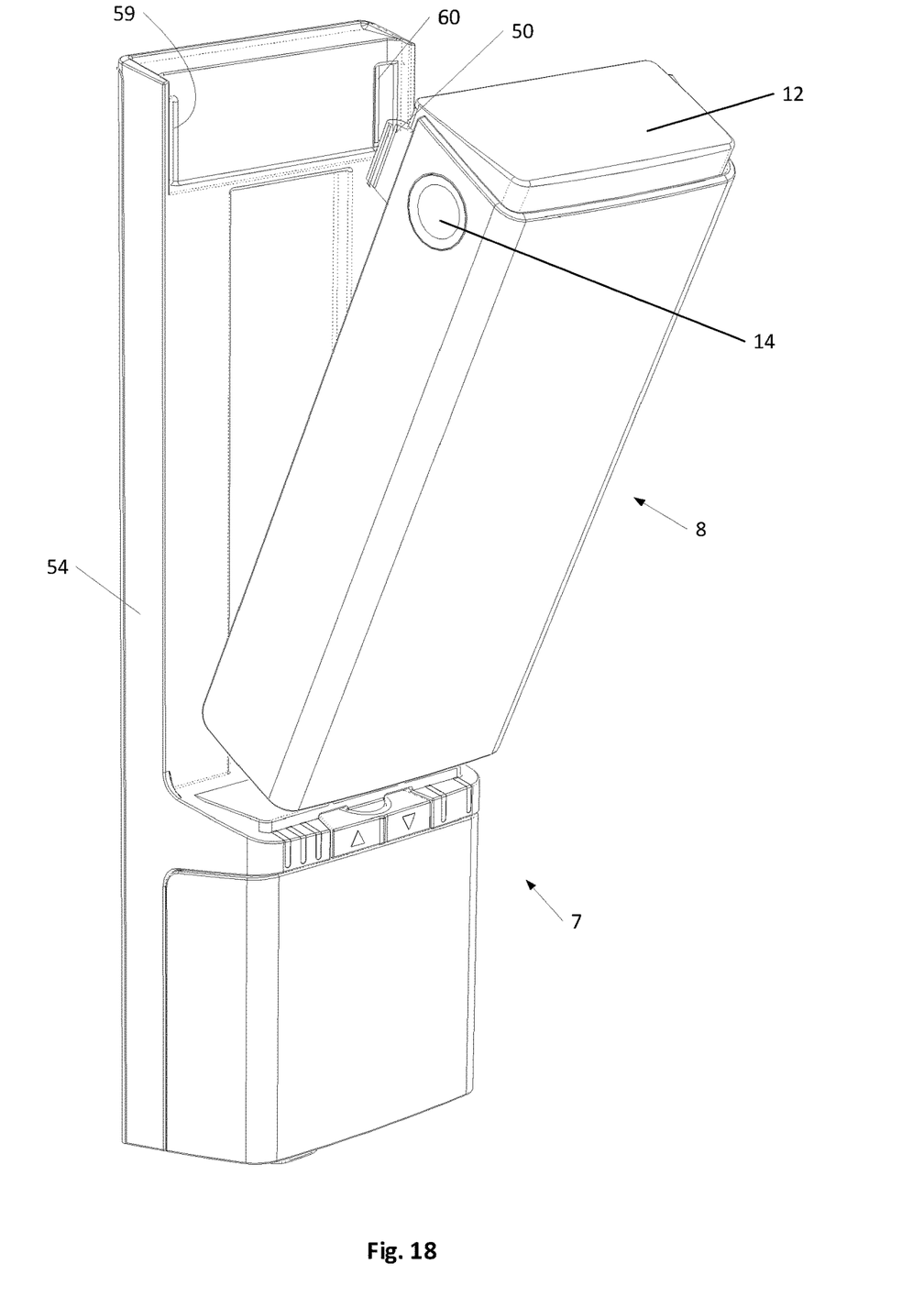
FIG. 18 shows a perspective view of the control box of FIG. 17.

FIG. 15 shows a control box 7 of the type shown in FIG. 1 for an electric linear actuator system. The control box 7 has a detachable power supply 8 in the form of a battery, which is connected to the base 54 of the control box 7. The base 54 has a seat 55 with a protruding cam 56, adapted for engagement with a recess 57 in the bottom of the housing 58 of the detachable power supply 8. As can be seen in FIG. 15-18, the power supply 8 is connected to the base 54 by placing the bottom of the detachable power supply 8 onto the seat 55 at an angle relative to the seat 55, such that the protruding cam 56 engages the recess 57. Hereafter, the power supply is tilted inwards towards the base 54, such that it aligns with it. To secure the detachable power supply 8 to the base, the hook 50,51 of the reactivation button 14,15 is brought to engage an indentation 59,60 in the base 54 in a latching manner. The hook 50,51 is embodied with a curved or slanted outer surface to guide it into engagement with the indentation 59,60 when the detachable power supply 8 is pushed towards the base 54. More precisely, the reactivation buttons 14,15 are forced towards each other when guided into engagement with the indentation 59,60. It is therefore not necessary to press the operating part 46,47 of the reactivation button 14,15 during the attachment of the detachable power supply to the control box 7. Further, should the activation button 12 be in the emergency position prior to attaching the detachable power supply 8 to the control box 7, the movement of the reactivation buttons 14,15 towards each other will cause the pins 52,53 to engage the protrusions 61,62 and deflect the arms 26,27, thereby bringing the activation button 12 into its neutral position.

The invention claimed is:

1. An emergency stop for a linear actuator system comprising:
   a housing (13),
   an activation button (12) adapted for activating a circuit breaker, where the activation button (12) as a neutral position and an emergency position,
   the emergency stop further comprising
   a spring (19) for spring-loading the activation button (12) for retaining it in the neutral position,
   a latching mechanism adapted for retaining the activation button (12) in the emergency position once it has entered this position,
   a release mechanism adapted to unlatch the latching mechanism, wherein
   the spring-loaded activation button (12) is pivotally connected to the housing (13) and arranged to pivot between the neutral position and the emergency position,
   where the spring-loaded activation button (12) comprises an arm (26,27) having one end attached to the underside (24) of the spring-loaded activation button (12),
   where the housing (13) comprises a wall piece (35,36) adapted for engaging a free end of the arm (26,27),
   and where the latching mechanism comprises,
   a protruding part (61,62) on the arm (26,27) and a receiving part (39,40) on the wall piece (35,36),
   where the protruding part (61,62) and the receiving part (39,40) are unlatched when the activation button (12) is in the neutral position and latched when the activation button (12) is in the emergency position, and
   where the release mechanism comprises a reactivation button (14,15) movable between a first and second position,
   where the reactivation button (14,15) unlatches the latching mechanism by disengaging the protruding part (61,62) from the receiving part (39,40) when the reactivation button (14,15) is moved from the first position to the second position.

2. The emergency stop according to claim 1, wherein the wall piece (35,36) constitutes a part of a groove (28,29), where the wall piece is an outer wall (35,36) of the groove (28,29), and where the groove (28,29) is further defined by an inner side wall (33,34), an end wall (37,38), and a bottom (31,32).

3. The emergency stop according to claim 1, wherein the reactivation button (14,15) comprises a pin (52,53) adapted for engaging the arm (26,27).

4. The emergency stop according to claim 1 wherein the release mechanism comprises a U-shaped spring (20) for spring-loading the reactivation button (14,15) for retaining it in the first position.

5. A control box (7) for a linear actuator system comprising a detachable power supply (8), where the power supply comprises an emergency stop (9,11) according to claim 1.

6. The control box (7) for the linear actuator system according claim 5, comprises a base (54) adapted for receiving the detachable power supply (8).

7. The control box (7) according to claim 6, wherein the reactivation button (14,15) of the detachable power supply (8) comprises a hook (50,51).

8. The control box (7) according to claim 7, wherein the base (54) comprises an indentation (59,60) for latching engagement with the hook (50,51) of the reactivation button.

9. A linear actuator system comprising a power supply (8), an electric linear actuator (6), and an operating unit (10), wherein the linear actuator system comprises a control box (7) according to claim 5.

10. A patient lift comprising a linear actuator system according to claim 9.

\* \* \* \* \*